US005694689A

United States Patent [19]

Filipowers

[11] Patent Number: 5,694,689

[45] Date of Patent: Dec. 9, 1997

[54] METHOD OF MAINSPRING REMOVAL TOOL FOR MAINSPRING REMOVAL

[76] Inventor: Zbigniew Filipowers, P.O. Box 160042, Altamonte Springs, Fla. 32716-0042

[21] Appl. No.: 505,130

[22] Filed: Sep. 15, 1995

[51] Int. Cl.[6] .............................. G04D 3/00; B23P 19/04

[52] U.S. Cl. ...................... 29/896.3; 29/228; 29/402.03; 81/6

[58] Field of Search .................................. 29/896.3, 228, 29/229, 402.03; 81/6

[56] References Cited

U.S. PATENT DOCUMENTS

| | | | |
|---|---|---|---|
| 435,844 | 9/1890 | Logan | 29/228 |
| 1,144,548 | 6/1915 | Jones | 81/6 |
| 1,240,783 | 9/1917 | Schmidt | 81/6 |
| 1,767,175 | 6/1930 | Glass | 81/6 |
| 2,527,751 | 10/1950 | Maheu | 81/6 |
| 4,183,268 | 1/1980 | Anderson | 29/228 |

*Primary Examiner*—P. W. Echols
*Attorney, Agent, or Firm*—Macdonald J. Wiggins

[57] ABSTRACT

A tool provides a means for easily and safely removing a timepiece mainspring from its barrel for cleaning and lubricating. A barrel holder is provided having a rim, and an essentially planar surface which includes openings therethrough. A mainspring barrel containing a mainspring is inserted into a mating opening. A barrel holder cap is snapped over a rim of the barrel holder. The cap surface includes openings opposite the barrel holder openings. The cap and barrel holder thereby form a receptacle for receiving an extracted mainspring. The watchmaker accesses a loop of the mainspring in the barrel holder, and removes the mainspring. The energy in the spring is thereby released and the expanding spring is captivated in the receptacle, permitting removal therefrom for cleaning and lubricating.

10 Claims, 2 Drawing Sheets

FIG. 7
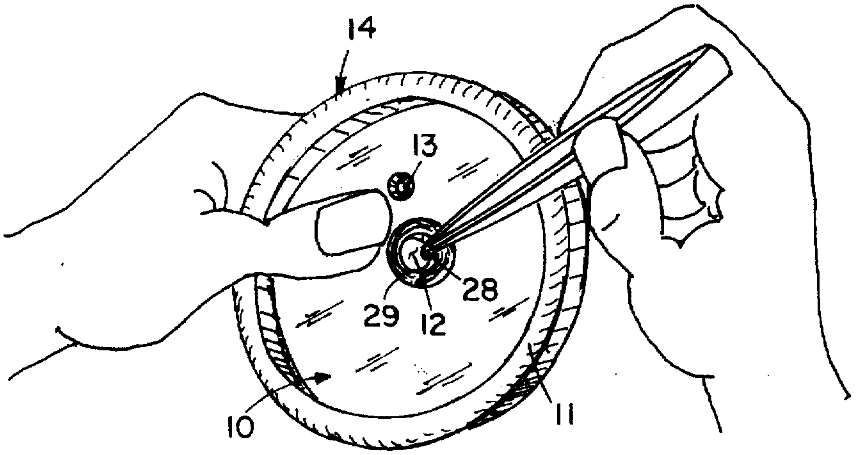
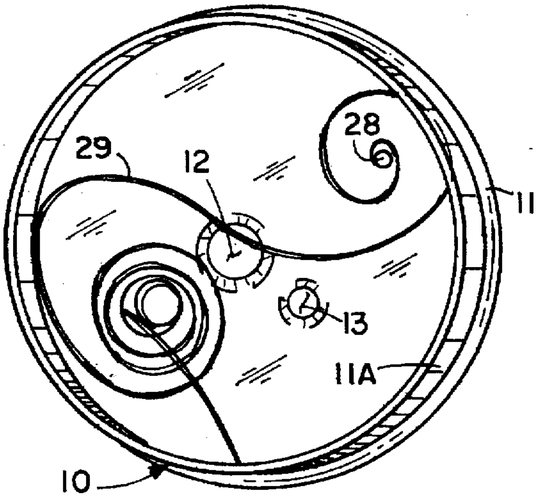
FIG. 8
FIG. 9
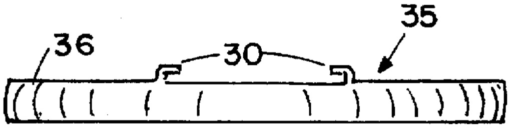
FIG. 10
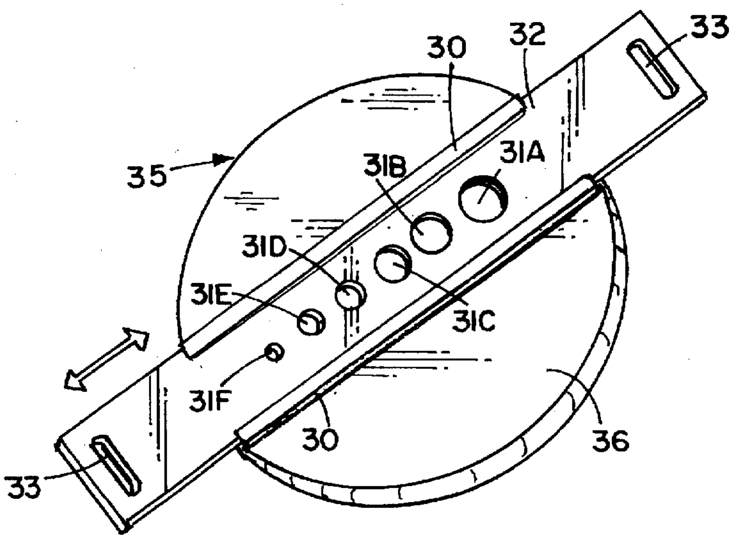

METHOD OF MAINSPRING REMOVAL TOOL FOR MAINSPRING REMOVAL

BACKGROUND OF THE INVENTION

1. Field of the Invention

The present invention relates to tools used by watchmakers, and more particularly to a tool that permits, during cleaning and repair of a watch, removal of the mainspring from its barrel easily and safely, and without possibility of loss thereof or injury to the watchmaker.

2. Brief Description of the Prior Art

Watches and clocks utilize a mainspring coiled within a cylindrical barrel, and having a gear ring disposed around an open end of the barrel. The inner end of the coiled mainspring includes a small loop therein. During repair or cleaning of a watch, clock, or the like, the mainspring should be removed from its cylindrical barrel, and cleaned in a cleaning solution to remove dried oil or other contaminants. The cleaned mainspring is then lubricated and replaced in its barrel. Mainspring barrels will range in size from a few millimeters to very large. As will be understood, regardless of the size of the mainspring, a relatively large amount of energy is stored therein, even in its most relaxed state.

In the prior art, during disassembly of a watch or clock, the watchmaker removes the barrel containing the mainspring. He then grasps the small loop formed in the inner end of the spring with tweezers or the like, and pulls outward. This action releases the stored energy of the spring, causing the spring to unwind suddenly. In many cases, this sudden release of energy causes the spring to slip out of the tweezers grip. The spring, and the barrel, may fly across the room, requiring a hunt for the parts. At worst, a very small spring may be lost, or the spring may strike the watchmaker in the face thereby causing injury.

Thus, there is a long felt need for a simple tool to permit a mainspring to be easily removed from its barrel without danger of loss or of injury to the watchmaker.

SUMMARY OF THE INVENTION

The mainspring removal tool of the invention includes a circular mainspring barrel holder formed of thin spring brass or the like, and having a narrow rim therearound. The barrel holder includes a circular central hole having the dimension of the largest standard mainspring barrel to be accommodated. A plurality of smaller circular holes may also be provided, each of the holes having the diameter of a different size barrel. The smaller holes are preferably arranged in a circle around the central hole.

A barrel holder cap is provided that mates with the rim of the barrel holder. The surface of the cap includes a central opening slightly smaller than the barrel holder central hole. A second small hole is provided adjacent the central hole thereof and having a center on the radius of the circle formed by the centers of the plurality of smaller holes.

To use the invention, the cap is snapped into the barrel holder. A barrel having a mainspring therein is inserted in the appropriately sized hole in the barrel holder with the barrel projecting within the rim and the gear ring contacting the outer surface of the rim. The barrel holder is then inverted thereby exposing an inner mainspring loop within the matching hole in the cap. A barrel holding knob having a small knob pin extending therefrom is inserted then through the center of the mainspring barrel. The watchmaker holds the assembly in one hand with the knob held by the fingers and the cap by the thumb. The other hand may then grasp the small inner loop of the mainspring with tweezers through the matching cap hole. By pulling upon the loop, the mainspring will then slide out of the barrel, quickly unwind, and be captivated by the rim of the cap. The barrel is removed and the cap unsnapped from the barrel holder, thereby giving the watchmaker easy access to the mainspring in its relaxed condition in the cap.

It is therefore a principal object of the invention to provide a tool for permitting a watchmaker to remove a coiled mainspring from its barrel quickly and easily without danger of loss or injury to himself.

It is another object of the invention to provide means for safely and easily removing a mainspring from its barrel and that can accept a wide range of barrel sizes.

It is yet another object of the invention to provide a simple, low cost tool for permitting removal of a mainspring from its barrel without danger of the mainspring being permanently or temporarily lost.

These and other objects and advantages of the invention will become apparent from the following detailed description when read in conjunction with the drawings.

BRIEF DESCRIPTION OF THE DRAWING

FIG. 7 is a perspective view of the assembly of FIG. 6 showing the method of removing a mainspring from its barrel in accordance with the invention;

FIG. 8 is a perspective view of the mainspring barrel holder cap with the barrel holder removed a showing a removed mainspring therein with the mainspring ready for cleaning and oiling;

FIG. 9 is a side view of an alternative mainspring barrel holder element of the invention; and FIG. 10 is the barrel holder element of FIG. 9 showing a changeable slide installed therein having a plurality of barrel receiving openings.

DETAILED DESCRIPTION OF THE PREFERRED EMBODIMENT

Figure 1:
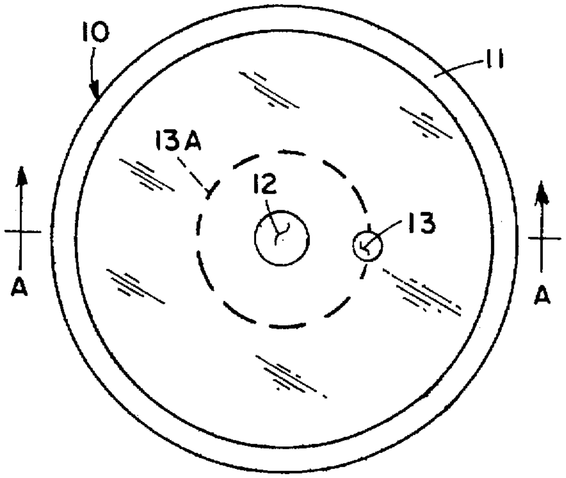
FIG. 1 is a plan view of a barrel holder cap of the invention.

A preferred embodiment of the invention is shown in FIGS. 1 through 6. FIG. 1 is an outer plan view of a barrel holder circular cap 10 having a top surface and an outer curved rim portion 11. Although cap 10 may be formed from various materials, a transparent material, such as an acrylic plastic, is preferred. A circular hole 12 is formed in the center of cap 10, along with a smaller hole 13 provided at a point on imaginary circle 13A. A depending rim 11A, as best seen in the cross-sectional view A—A of FIG. 3, extends downwardly from outer rim portion 11, having a slightly smaller diameter than outer rim portion 11. It is to be understood that the depth of rim 11A and of the barrel holder rim 16 may be selected in accordance with the height of the mainspring barrels desired to be accommodated, as will be described herein below.

Figure 2:
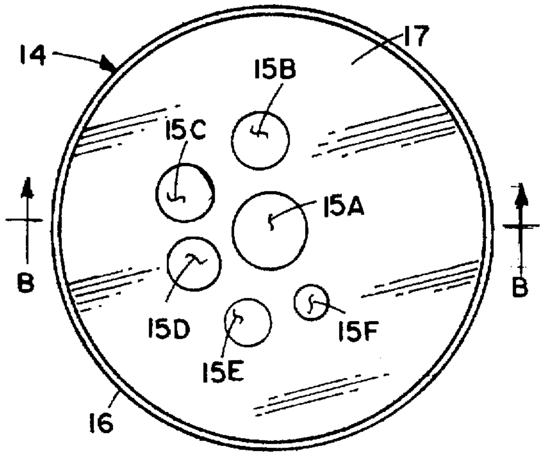
FIG. 2 is a plan view of a mainspring barrel holder showing a plurality of circular holes for receiving a variety of spring barrels.
Figure 4:
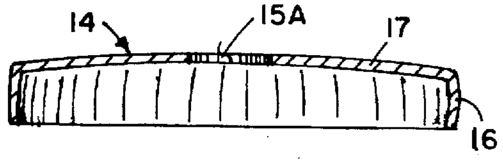
FIG. 4 is a cross sectional view of the mainspring barrel holder of FIG. 2 through the plane B—B thereof.

A mainspring barrel holder 14 for mainspring barrels is shown in FIG. 2 in an inner plan view thereof. Barrel holder 14 is preferably formed of a thin metal such as brass. The underside of an essentially flat surface 17 is shown having a plurality of holes of various sizes 15A through 15F therein. Each hole is selected to match the outer diameter of a standard mainspring barrel. It is to be noted that hole 12 of cap 20 in FIG. 1 is smaller than hole 15A of FIG. 2. Similarly, hole 13 of FIG. 1 is smaller than any of holes 15B to 15F which are arranged on a circle having the same diameter as circle 13A of FIG. 1. In FIG. 4, a slightly curved rim 16 is formed around, and depends from, the circumference of holder 14 as seen in the cross-sectional view through plane B—B of FIG. 2.

Figure 3:
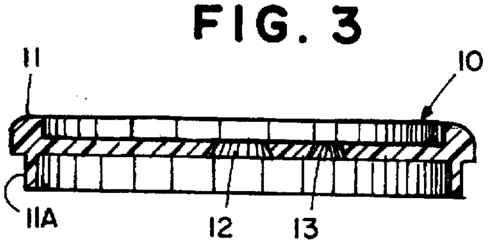
FIG. 3 is a cross-sectional view of the barrel holder cap of FIG. 1 through the plane A—A thereof.

As best seen in FIG. 3, each of holes 12, 13 of cap 10 is preferably countersunk on the underside thereof.

Figure 5:
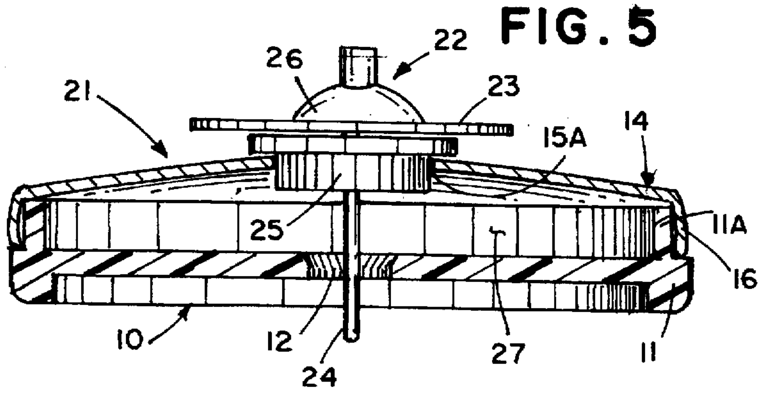
FIG. 5 is a cross sectional view of the assembled tool of the invention having a typical mainspring barrel mounted therein, and having the barrel holding knob inserted through the barrel.
Figure 6:
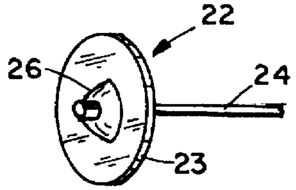
FIG. 6 is a perspective view of a barrel holding knob.

Turning now to FIGS. 5 and 6, an assembly 21 of cap 10, holder 14 and barrel holding knob 22 is shown in cross-sectional view. Knob 22, as seen in the perspective view of FIG. 6, has been inserted through a center pivot hole of a typical mainspring barrel 25, hole 15A of barrel socket element 14, and countersunk hole 12 of cap 10. As will be recognized, a space 27 has been formed between the lower edge of barrel 25 and the inner surface of cap 10 for receiving and captivating the mainspring in barrel 25 after removal therefrom. Barrel holding knob 22 includes a pin 24, a holding skirt 23, an a knob 26.

The operation of the mainspring removal tool will be explained with reference to FIGS. 5, 6, 7, and 8. The watchmaker, after removing the mainspring and barrel 25 from a watch, inserts barrel into the hole 15A–15F that matches the outer circumference of the barrel as shown in FIG. 5. The watchmaker grasps the assembly of FIG. 5 with one hand between the thumb and fingers, holding the fingers over knob 26 and skirt 23, with the thumb on cap 10 as shown in FIG. 7. The barrel holder surface 17 may then be squeezed, causing it to "oil-can", or snap downward, narrowing the gap 27 of FIG. 5. The mainspring will now be visible through central hole 12 of cap 10, with the loop 28 formed in the inner end of the mainspring being visible. The watchmaker then grasps the spring loop 28 with the tweezers, and relaxes the barrel holder surface 17, allowing it to return to its original position thereby increasing the depth of gap 27. As seen in FIGS. 3 and 6, holes 12 and 13 are countersunk on the underside of the cap 10, thereby, assuring that the spring loop 28 will be accessible to be grasped by the tweezers.

After grasping loop 28 the watchmaker pulls the spring loop 28 outward, causing the spring to slide from its barrel 25 into space 27. As the spring 29 relaxes it spreads outwardly and is thereby captivated by depending rim 11A of cap 10. The watchmaker may then remove knob 22 and barrel 25 from the assembly. The barrel holder 14 is then removed from space 27 of cap 10, exposing the released spring as shown in FIG. 8. The watchmaker can then remove the captivated spring 29 from holder 14, ready for cleaning and lubricating.

Referring now to FIGS. 9 and 10, an alternative design of the mainspring removal tool of the invention is shown. A barrel holder body portion 35 is shown in edge view in FIG. 9. The top surface 36 has a pair of tracks 30 formed therein. FIG. 10 shows body portion 35 in perspective view in which a slide 32 has been inserted in tracks 30. A plurality of holes 31A–31F, matching the diameters of standard barrel sizes is formed in slide 32. After snapping body portion 35 over cap 10 of FIG. 1, the watchmaker inserts a slide having the desired hole sizes, and places the mainspring and barrel in the proper size hole 31. He then inverts the assembly, installs cap 21 over rim 11A, and moves slide 32 by means of grips 33 to align with hole 12. Knob 22 is inserted, and the mainspring removed as described hereinabove. As will be apparent, the tool 35 may include a plurality of slides 32, each with different size holes, such that a very wide range of barrel sizes can be accommodated.

A tool and method for safely and easily removing a mainspring from a timepiece for cleaning and lubricating has been disclosed having a mainspring barrel holder and a cap for receiving the mainspring upon removal. Although a specific design has been shown for illustrative purposes, it will be clear to those of skill in the art that various changes thereto may be made without departing from the spirit and scope of the invention.

I claim:

1. A tool for removing a mainspring in a mainspring barrel from a watch or clock and for captivating the removed mainspring comprising:

a) a mainspring barrel holder having a first essentially planar surface, a first rim depending from said planar surface, and a circular opening through said surface for accepting and holding said mainspring barrel; and b) a barrel holder cap having a second planar surface, said surface having a second circular opening therethrough, said second opening having a smaller size than said barrel holder circular opening, said cap having a second rim depending from said second planar surface, said cap rim mating with said mainspring barrel holder rim thereby forming a mainspring-receiving space such that said second opening is aligned with said first circular opening thereby providing access to said mainspring via said second opening;

c) whereby said mainspring in said mainspring barrel can be safely removed therefrom through said circular opening in said barrel holder cap and captivated within said mainspring-receiving space.

2. The tool as defined in claim 1 which further comprises a plurality of circular openings in said mainspring barrel holder for accepting a plurality of mainspring barrels, each of such barrels having a different diameter.

3. The cap as defined in claim 1 in which said mainspring barrel holder is formed of a thin metal.

4. The cap as defined in claim 1 in which said cap is formed of a transparent plastic material, and in which said hole is circular and is countersunk on an inner face thereof.

5. The tool as defined in claim 1 in which said mainspring barrel holder and said cap are circular.

6. The tool as defined in claim 1 which further includes a barrel holding tool having a pin, a holding skirt, and a knob wherein said pin is for insertion through said mainspring barrel, and said barrel holder, said barrel holding tool for maintaining alignment of said mainspring barrel, said barrel holder, and said barrel holder cap during removal of said mainspring from said barrel.

7. A method for safely removing a mainspring from its mainspring barrel comprising the steps of:

a) providing a tool having a mainspring barrel holder, said holder having a circular opening therethrough for receiving said mainspring barrel, said tool having a cap mating with said barrel holder, said cap having an opening aligned with said barrel holder circular opening, thereby forming a mainspring-receiving and captivating space therebetween;

b) installing a mainspring barrel in said barrel holder;

c) grasping said mainspring through said cap opening; and d) removing said mainspring from its barrel, causing said mainspring to expand into said mainspring-receiving and captivating space.

8. The method as defined in claim 7 which includes the further steps of:

a) separating said cap from said barrel holder; and b) removing said expanded mainspring from said cap.

9. A tool for removing a mainspring in a mainspring barrel from a watch or clock, and for captivating the removed mainspring comprising:

a) a mainspring barrel holder having a first essentially planar surface, a first rim depending from said planar surface, and a pair of tracks formed in said first surface thereby forming an opening between said tracks;

b) an elongate slide slidably engaged by said tracks, wherein said slide includes a plurality of mainspring barrel-accepting openings of differing sizes; and c) a barrel holder cap having a second planar surface, said surface having a plurality of second openings therethrough, said second openings each having a smaller size than matching barrel holder circular openings, said cap having a second rim depending from said second planar surface, said cap mating with said mainspring barrel holder rim such that said second openings are aligned with said first circular openings, thereby providing access to said mainspring via a matching one of said second openings;

c) wherein removing said mainspring from said barrel releases said mainspring to expand and thereby be captivated within said holder and said cap.

10. The tool as defined in claim 9 which includes a plurality of said slides having differing sized openings therein.

* * * * *